United States Patent [19]

Willenbrock et al.

[11] Patent Number: 4,966,274
[45] Date of Patent: Oct. 30, 1990

[54] CONTROL SYSTEM FOR A WALKING BEAM ASSEMBLY OF A FORGING PRESS

[75] Inventors: Walter Willenbrock; Eberhard Werner, both of Leverkusen, Fed. Rep. of Germany

[73] Assignee: Eumuco Aktiengesellschaft Für Maschinenbau, Leverkusen, Fed. Rep. of Germany

[21] Appl. No.: 209,275

[22] Filed: Jun. 20, 1988

[30] Foreign Application Priority Data

Jul. 1, 1987 [DE] Fed. Rep. of Germany ....... 3721694

[51] Int. Cl.$^5$ .............................................. B65G 25/00
[52] U.S. Cl. ..................................... 198/621; 414/751
[58] Field of Search ................. 198/621, 774; 414/751

[56] References Cited

U.S. PATENT DOCUMENTS

| | | | |
|---|---|---|---|
| 3,655,070 | 4/1972 | Haydu | 198/621 |
| 4,404,837 | 9/1983 | Allen et al. | 198/621 X |
| 4,436,199 | 3/1984 | Baba et al. | 198/621 X |
| 4,511,029 | 4/1985 | Okawa | 198/621 |
| 4,540,087 | 9/1985 | Mizumoto | 198/621 |
| 4,735,303 | 4/1988 | Wallis | 198/621 |

Primary Examiner—H. Grant Skaggs
Assistant Examiner—D. Glenn Dayoan
Attorney, Agent, or Firm—Neil F. Markva

[57] ABSTRACT

The walking beam assembly of the forging presses operates in several movement phases including a lifting movement, advance movement, lowering movement, opening movement, return movement, and closing movement. Step motors control driving members which perform individual moving processes in the individual movement phases. In turn, driving member processors drive the step motors by frequencies changing with time. When the velocity or frequency of the step motors are plotted on the ordinate of a graph and time along the abscissa of the graph, a trapezoidal graph form is produced along the time (t) line of the graph for each of the movement phases. Each trapezoidal form includes a rising flank and a falling flank with some of the flanks for adjacent driving member phase movement overlapping in time. The opening and return movement phases form a fixed cycle having a length predetermined and constant for all cycle lengths. The remaining phases form a varicycle having a length that changes with the length of the cycle time. During the fixed cycle, the walking beam assembly or manipulator does not move any workpieces. The varicycle can be adjusted to the respected mass of the workpieces. For workpieces having a large mass, the times for acceleration and delay are reduced.

25 Claims, 6 Drawing Sheets

CONTROL SYSTEM FOR A WALKING BEAM ASSEMBLY OF A FORGING PRESS

FIELD OF THE INVENTION

This invention relates to a control system for a walking or lifting beam assembly of a forging press. More specifically, the invention is directed to a control system having a particular assembly of parts performing a series of process operations to effect the control of the walking beam assembly.

BACKGROUND OF THE INVENTION

Walking or lifting beam assemblies or automatics for forging presses are known for use to supply workpieces in a stepwise fashion to the processing position or work station within the forging press. A control system for such a walking in German Patent No. 2 061 043 and comprises beam assembly is found having gripping devices for gripping workpieces between the walking beams when the walking beams have been closed with respect to each other in a clamping or closing movement. Once clamped upon the workpiece, the walking beams are lifted upwardly and carry the workpiece or workpieces in an advance movement for conveyance to a work station.

During the advance movement, the workpieces are maintained above the operating position for the work station. Upon reaching the work station, the walking beams are lowered to the work station and upon opening, the workpieces are released into the work station where the workpieces are forged during a predetermined operating cycle of the press stroke of a forging press. The walking beams are then returned to their initial position in their retracted or open condition.

In the prior art system, fast press stroke cycles require very fast movement of the walking beams without loss of operational accuracy. In particular, the operational phases for loading and advancing the workpieces may be very short. If heavy workpieces are to be conveyed, the mass moment of inertia of the workpieces can delay the manipulator movements for the lifting beam assembly.

A further problem of known manipulators or walking beam assemblies is related to the manipulator parts being subjected to large mechanical stresses due to considerable acceleration and slowing down of the individual moving processes. Furthermore, many undesired machine vibrations may occur during operation of the known walking beam assembly.

The construction and operation for a known walking or lifting beam assembly for a forging press is also disclosed in copending U.S. patent application Ser. No. 86,531 filed Aug. 18, 1987 now U.S. Pat. No. 4,873,860 owned by the same assignee and is hereby incorporated herein by reference in its entirety.

PURPOSE OF THE INVENTION

A primary object of this invention is to provide a control system for a walking beam assembly of a forging press adapted for operation with different time lengths of cycles while making available the largest possible portion of the cycle for gripping the workpieces and conveying them to the operational work station.

SUMMARY OF THE INVENTION

As described herein, the control system of the invention operates with a fixed cycle length of time for the opening and return movement phases for the walking beams during an overall cycle period. The remaining movement phases are effected during a variable cycle portion of time corresponding to the remaining time available within the overall cycle period. During the opening, closing and return movement phases, the walking beam movements are performed without the need of moving workpiece masses. Thus, since these phases cannot be influenced by workpiece masses, they can be fixed according to the construction of the assembly and the mass of the walking beam members.

The length of time for both fixed movement phases, which is called "fixed cycle" herein, is designed for maximum speed and remains constant even under slower operation. In this manner, if a longer time is needed for gripping and moving the workpiece, the entire length of time for the cycle is not extended in proportion thereto. The extension of time applies only to those phases during which the workpiece is moved. If desired, the closing of the walking beams with respect to each other can be included in the "fixed cycle."

The walking beam assembly has at least one walking beam member movable by respective driving means in a cycle of movement phases including a closing movement, a lifting movement, an advance movement, a lowering movement, an opening movement, and a return movement. The respective driving means are operated by control mechanisms in a sequential control.

The system of the invention includes fixedly determining the lengths of time for the opening and return movement phases according to a shortest cycle length. The lengths of time for at least some other remaining movement phases are varied according to a selected time cycle length or inserted holding time. A step motor operatively connected to the driving means is used to effect the movement phases. The frequency of the step motor is continuously increased in each movement phase to a top frequency value which is maintained for a predetermined length of time and then continuously decreased to zero again.

With the control system of the invention, a very fast operation of the manipulator or walking beam assembly is possible. Normally, manipulator control takes over guidance of the press control i.e., the stroke of the press is initiated by the sequential control of the manipulator or walking beam assembly.

The control system according to the invention insures that the manipulator movements to be performed without workpieces are always executed at high speed while the remaining movement phases can be varied depending upon the size or mass of the workpieces being transported. This portion of the movement phases within one cycle length of time is variable. The length of time for executing the fixed cycle remains constant independently of the cycle time length and of the time period of disuse or auxiliary phases inserted into the cycle time length. Thus, the walking beam assembly can be operated with the shortest cycle time length for the respective workpieces thereby shortening the cycle times for the press.

By controlling the frequency values and speed of rising and falling of the frequency, the driving members are smoothly started and slowed down in every movement phase. Strong acceleration and delays are thus eliminated thereby reducing the mechanical stress of the walking beam assembly and precluding machine vibrations.

When the length of the top frequency is fixed in each phase, a lengthening of time for the phase influences the height of the top frequency and the slope of the rising and falling flank portions. Thus, by extending the phase time length, minimal acceleration and speed values result while maintaining smooth starting and slow down of the walking beam assembly.

With the control system of this invention, the development in time of the frequency in speed is calculated again in each phase with the actual or absolute value of the position of the respective driving member being taken into account thereby preventing the transmission of any lag errors onto the following movement phases.

BRIEF DESCRIPTION OF DRAWINGS

Other objects of this invention will appear in the following description and appended claims, reference being made to the accompanying drawings forming a part of the specification wherein like reference characters designate corresponding parts in the several views.

DETAILED DESCRIPTION OF INVENTION

Figure 1:
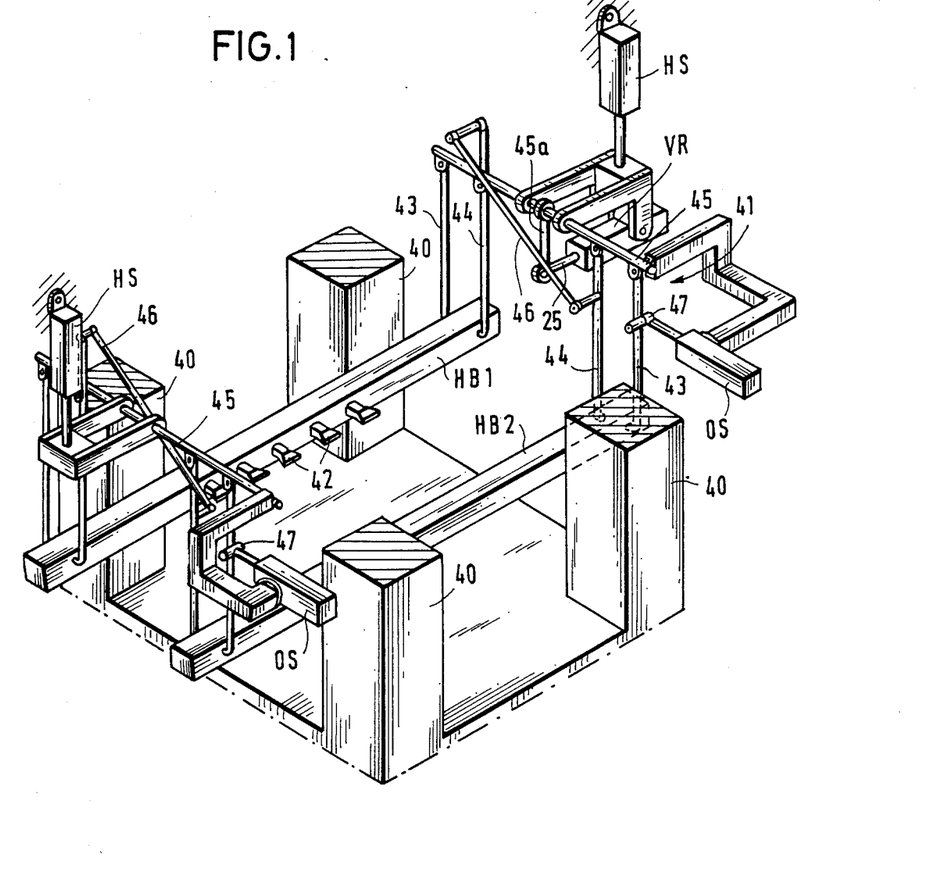
FIG. 1 is a schematic perspective view of a walking beam assembly according to the invention.

FIG. 1 shows a lifting or walking beam assembly or automatic, generally designated 41, for a forging press. Only portions of four (4) posts 40 of the press itself appear in the drawing with the press ram being left out for clarity and simplicity.

The walking beam assembly 41 disposed between posts 40 comprises two horizontal parallel walking beams HB1 and HB2. Gripping devices 42 adapted to engage workpieces (not shown) are secured to those sides of walking beams HB1 and HB2 that face each other. During closing movement of the walking beam assembly 41, gripping devices 42 on the facing sides of beams HB1 and HB2 engage the workpiece from opposite sides.

Figure 3:
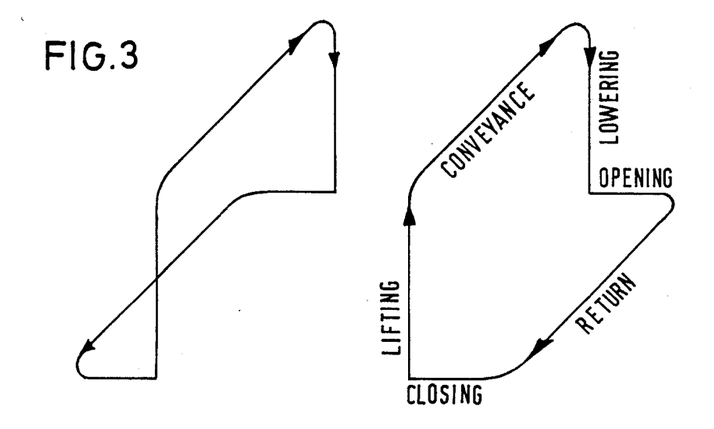
FIG. 3 is a perspective diagram of the walking beam movements for the assembly of FIG. 1.

Then, walking beams HB1 and HB2 are lifted upwardly and conveyed in lengthwise direction during an advance or conveyance movement in accordance with the perspective diagram shown in FIG. 3. In this embodiment conveyance is effected by an amount equal to the distance of two gripping devices 42. Subsequently, walking beams HB1 and HB2 are moved downwardly to a lowermost point in a lowering movement phase and moved apart from each other to complete an opening movement phase. Return movement is started in the lowered state followed by a closing movement onto the next workpiece to be processed.

Two links 43 and 44 suspend each walking beam HB1 and HB2 at both ends thereof and are pivotally attached to bridge members 45 extending transversely across walking beams HB1 and HB2. Each bridge member 45 can be vertically moved by each driving member HS located at opposite ends of walking beam assembly 41. Thus, vertical driving members HS effect the lifting and lowering movement phases of walking beams HB1 and HB2 through links 43 and 44 and bridge members 45 as shown.

Lengthwise driving member VR is secured to a bridge member 45 at one end of the beam assembly 41 via link 45a. Driving member VR engages link 44 through any known or desired linkage (not shown) and swivels link 44 around bridge member 45 while walking beams HB1 and HB2 are swinging in a lengthwise direction parallel to the longitudinal axes of beams HB1 and HB2. Lengthwise driving member VR is located at one end of walking beam assembly 41 as shown while vertical driving members HS exist at both ends thereof.

Transverse driving members OS engage a link 43 at an intermediate point between each bridge member 45 and a working beam at each end of walking beam assembly 41 as shown. A link engaging element 47 moves in a direction transverse to the longitudinal axis of walking beams HB1 and HB2 to drive each pair of links 43 and 44 in the manner of a parallelogram. One end of coupling link 46 is connected below bridge member 45 to a link 44 supporting beam HB2. The other end of coupling link 46 is connected at a point above bridge member 45 to an upper portion of link 44 supporting walking beam HB1. Link 46 thereby connects both pairs of links 43 and 44 to each other.

Each pair of links 43 and 44 connected to walking beam HB2 are moved inwardly or outwardly with respect to and by driving members OS via engaging elements 47. Consequently, the pair of links 43 and 44 connected to walking beam HB1 correspondingly swing inwardly with respect to the pairs of links 43 and 44 connected to walking beam HB2. Coupling links 46 connect each pair of links 43 and 44 located at each end of walking beams HB1 and HB2 in such a manner that both walking beams HB1 and HB2 are moved toward and away from each other by driving members OS via driving engaging elements 47.

Thus, with the action of vertical driving members HS, lengthwise driving member VR and transverse driving members OS, walking beams HB1 and HB2 can perform the overall movement as schematically shown in FIG. 3. Each of the driving members HS, VR and OS must be specifically controlled to accomplish the particular movements.

Figure 2:
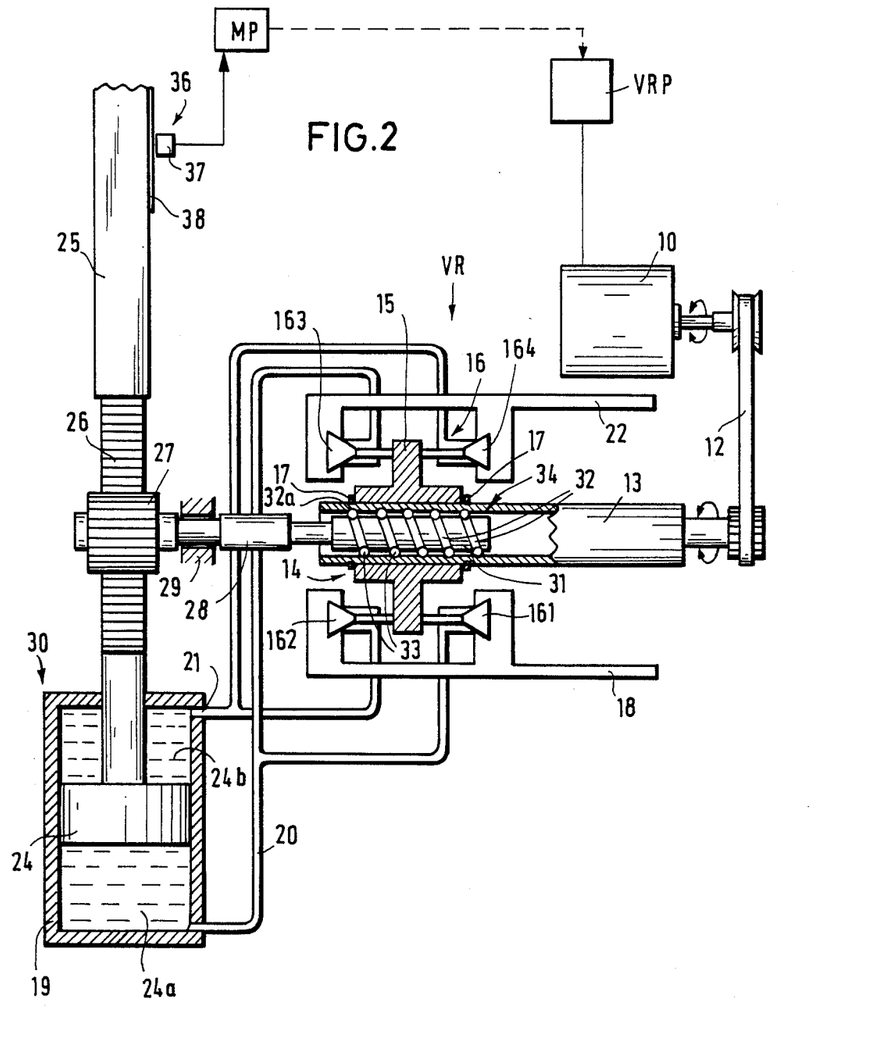
FIG. 2 is a fragmentary schematic view partially in section of a driving member according to the invention.

More specifically, FIG. 2 shows the construction of lengthwise driving member VR to effect the advance and return movements for walking beams HB1 and HB2. The other driving members HS and OS have constructions arranged in a similar fashion.

The electro-hydraulic lengthwise driving member VR includes an electric step motor 10 controlled by a microprocessor VRP. The output shaft of step motor 10 drives the advance member 13 via a synchronous drive 12 such as a toothed belt. Advance member 13 consists of one input shaft of the compensating gear, generally designated 14.

Compensating gear 14 includes a radially projecting control disk member 15 supported on advance member 13. Disk member 15 controls valve assembly, generally designated 16, by its axial movements. Control disk member 15 is fixed in axial direction with respect to advance member 13 by axial bearings 17 secured to advance member 13.

Valve assembly 16 comprises two valves 161 and 162 connected to pressure line 18 and two valves 163 and 164 connected to return line 22. Valve 161 connects to line 20 which leads into one end or cylinder space 24a of hydraulic cylinder 19 and valve 162 connects to line 21 which leads into the other end or cylinder space 24b of hydraulic cylinder 19. In FIG. 2, control disk member 15 is shown in a neutral position wherein all valves 161, 162, 163 and 164 are closed.

If control disk member 15 moves to the right of the neutral position, valve 161 is open connecting line 20 to pressure line 18 while valve 162 remains closed. At the same time, valve 164 is open connecting line 21 to return line 22 while valve 163 remains closed. When control disk member 15 moves left with respect to the neutral position, valve 162 opens thereby connecting pressure line 18 to line 21 while valve 161 remains closed. At the same time, valve 163 opens thereby connecting return line 22 to line 20 while valve 164 remains closed. Thus, both valves 161 and 162 connected to pressure line 18 and both valves 163 and 164 connected to return line 22 are actuated inversely with respect to each other.

Stated in another way, valve 163 connects return line 22 to line 20 and valve 164 connects return line 22 to line 21. Valves 161 and 163 connected to line 20 are arranged at opposite sides of control disk member 15. Valves 162 and 164 connected to line 21 are also arranged on opposite sides of control disk member 15.

Piston rod 25 for piston 24 contained in hydraulic cylinder 19 is connected to a part or linkage being operated. Piston rod 25 includes a toothing portion 26 which engages the toothing of pinion 27. Pinion 27 is fixedly secured to responding member 28 consisting of the second input shaft of compensating gear 14. This second input shaft is secured against axial displacement and rotatably supported in a bearing mechanism 29. The hydraulic motor, generally designated 30, includes cylinder 19, piston 24 and piston rod 25 to move the particular part or linkage to be operated or moved.

Responding member 28 includes a headpiece 31 extending into the interior of hollow advance member 13. Helical grooves 32a of semi-circular cross section are located on the inside surface of hollow advance member 13. Counterpart helical grooves 32 of semi-circular cross section are located on the outer surface of headpiece 31. Balls 33 are disposed within the grooves 32 and 32a as shown. Thus, headpiece 31 together with advance member 13 forms a worm drive mechanism of extremely low friction. Using the same principle, in another embodiment, headpiece 31 could have an external thread engaging an internal thread located on the inner surface of advance member 13. However, such a threading engagement would cause a larger amount of friction. On the other hand, the ball gear assembly 34 as shown and described herein, forms a worm gear of very low friction.

When step motor 10 rotates advance member 13 while responding member 28 is held against rotation by piston rod 25, advance member 13 is thereby axially displaced because of the spindle effect. Since control disk member 15 is axially fixed on advance member 13, it follows the movement of advance member 13 thereby opening either valves 161 and 164 or valves 162 and 163 depending on whether it moves left or right of the neutral position. Thus, either lower cylinder space 24a of hydraulic cylinder 19 is subjected to pressure and the upper cylinder space 24b of cylinder 19 becomes pressureless or the upper cylinder space 24b of cylinder 19 is subjected to pressure and the lower cylinder space 24a of cylinder 19 becomes pressureless.

Depending upon which set of valves are open, piston 24 performs a shifting movement whereby pinion 27 rotates responding member 28. When responding member 28 and headpiece 31 rotate, advance member 13 performs a movement which is opposite to the first movement initiated by step motor 10 under the action of ball gear mechanism 34. Thus, control disk member 15 returns to its neutral position again where all valves 161 to 164 are closed and the driving process is completed.

In a manner to be described below, step motor 10 may be controlled by driving member processor VRP using pulses of varying frequency.

An absolute motion-pickup mechanism, generally designated 36, is connected to housing (not shown) of the particular driving member and detects the actual position of piston rod 25. Motion-pickup mechanism 36 comprises a sensor 37 which reacts to or on a multitrack signal strip 38 fastened to piston rod 25. Sensor 37 delivers a signal corresponding to the actual position of piston rod 25 to a master processor MP used in common for all five driving members HS, OS and VR.

Figure 4:
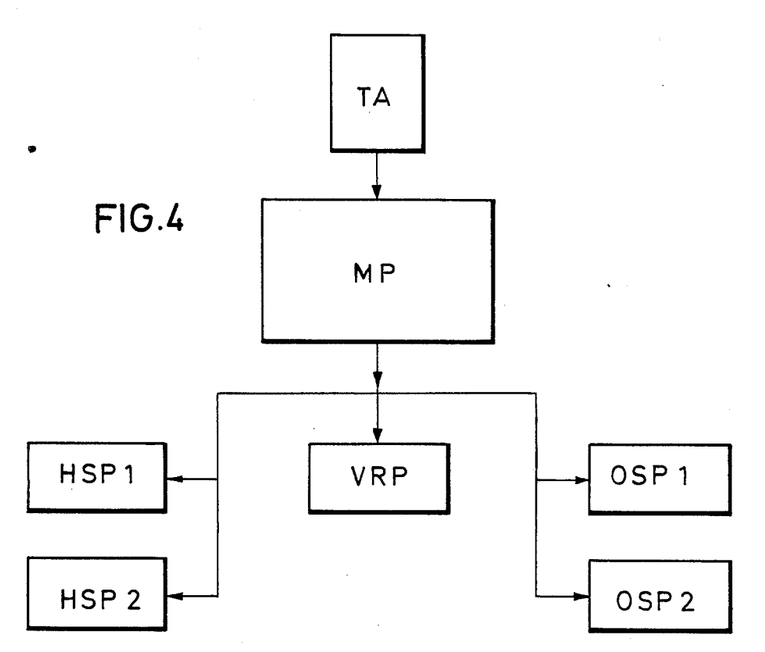
FIG. 4 is a block flow diagram of a control system according to the invention.

Referring to FIG. 4, master processor MP controls all five driving member data processors HSP1, HSP2, OSP1, OSP2 and VRP. Driving member data processors HSP1 and HSP2 control driving members HS for lifting and lowering vertical movements, adjusting driving members data processors OSP1 and OSP2 control transverse driving members OS for opening and closing movements of beams HB1 and HB2, and driving member data processor VRP controls lengthwise driving member VR for advance and return movements of the lifting or walking beams HB1 and HB2.

A keyboard TA connected to master processor MP is used to input various control signals to the system. For example, the cycle time or the paths to be run through in the individual phases are placed in master microprocessor MP to control the various driving members HS, OS and VR via driving member data processors HSP1, HSP2, OSP1, OSP2 and OS.

For each cycle of movement phases, master processor MP delivers control signals representing the following specific values to each of the driving member data processors HSP1, HSP2, OSP1, OSP2 and OS; namely, the actual position of piston rod 25 for each driving member HS, OS and VR as detected by motion-pickup mechanism 36 (thereby determining the position on the curves shown in FIG. 3); the predetermined desired position to be maintained at the end of the phases, predetermined data indicating the top frequency (maximum frequency) at which step motor 10 is to be operated in this phase, and a predetermined degree of angle WG within the cycle at which the respective phase starts. From these specific values, the driving member data processors HSP1, HSP2, OSP1, OSP2 and VRP calculate (gradually changing pulse frequencies) for controlling each step motor 10 connected to each respective driving member HS, OS and VR in the manner shown in FIG. 5.

Figure 5:
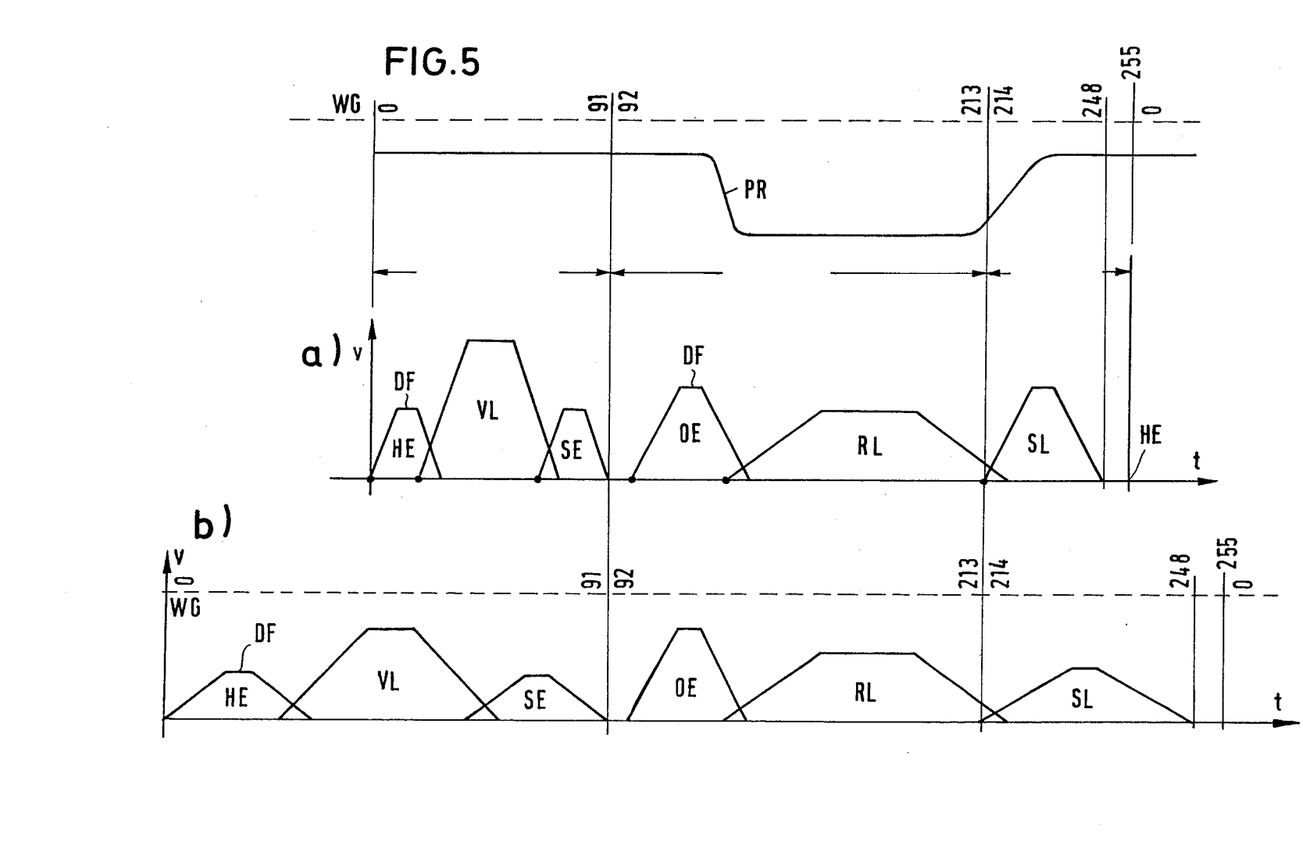
FIG. 5 shows graphical representations of the development in time of the speeds of the different driving members with respect to different cycle lengths according to the invention.

Referring to FIG. 5, the development of a cycle period in time t of speed v for the individual phases; namely, lifting movement HE, advance movement VL, lowering movement SE, opening movement OE, return movement RL, and closing movement SL is shown in graph (a). The respective speed v is proportionate to the frequency applied to the respective step motor 10 driving the particular driving motor to accomplish the individual phases. In each of the phases, the frequency increases from zero linearly and in the form of a ramp or rising flank portion until reaching the predetermined top frequency DF. Then, the speed or frequency linearly decreases to zero again, that is, with a fall in a falling flank portion that is equal to the rise of the rising flank portion. Therefore, the individual phases are shaped as a trapezoid or in a trapezoidal form.

The initial and end flank portions of several of the phases overlap each other so that the curves shown in FIG. 3 are not rectangular but have rounded corners or edges. Consequently, smooth transitions between the individual phases are obtained. Only operating phases SE and OE are separated from each other by a short interval. The surface area of the trapezoidal forms of phases HE and SE are equal to each other. On the other hand, the trapezoids VL and RL are shaped differently from each other but comprise the same surface area because during advance movement, the same distance has to be covered as during return movement.

Above the graphical representation of the cycle of movement phases in graph (a), the development of the operating cycle for a typical forging press stroke is shown in time t for the operating process of press ram PR. The downward movement of press ram PR starts approximately at the end of the top frequency DF in opening phase OE i.e., during the opening movement of the walking or lifting beams HB1 and HB2. While press ram PR is in the bottom dead center, the manipulator or walking beam assembly 41 performs the return movement phase RL. During the closing movement phase SL, press ram PR moves upwardly again.

The over-all cycle of the walking or lifting beam movement from zero degrees to 359 degrees is divided into equal angular steps from zero to 255. Thus, each angular step is $\alpha \times 1/1.408$ wherein $\alpha$ indicates the angle in degrees of angle (359:255=1.408). Closing phase movement SL ends at angular step 248. During angular steps 249-255, a time of rest includes no movement being performed.

Graph (a) in FIG. 5 refers to the shortest cycle time length obtained when the manipulator or lifting beam assembly 41 handles no workpieces at all or only workpieces of very light weight. Graph (b) shows the development of a cycle period in time t obtained during a longer cycle time length. The trapezoidal forms of opening phases OE and return movements RL are equal in both graphs (a) and (b) because these movements are always performed at the same speed independently of the over-all cycle life or period. Thus, the section between angular steps 92 and 213 always has a constant time length which is defined as a "fixed cycle." In other words, as is evident in the drawings and as disclosed herein, a cycle of movement phases is completed within a cycle period having a preselected length of time t. The "fixed cycle" portion of the preselected length of time of the cycle period includes the opening and return movement phases and is necessarily predeterminedly fixed in accordance with the predetermined operating cycle of the press stroke of press ram PR as shown.

However, a prolongation of the over-all cycle time length effects a prolongation of the other phases i.e., lifting movement HE, advance movement VL, lowering movement SE and closing movement SL. The length of time for effecting these phases is called a "varicycle" or varied cycle where the sped of the walking or lifting beams HB1 and HB2 is variable. In both graphs (a) and (b) for the respective shortest cycle period and longer cycle period having preselected lengths of time, the surface areas of trapezoids HE are equal to each other because the path of the movement of the lifting movement is over the same distance. Also, the surface areas of the trapezoids VL, SE and SL in respective graphs (a) and (b) are equal to each other. Finally, in both graphs (a) and (b), the length of time for the top frequency DF is the same in the phases of the same name.

Accordingly, only the slopes of flank portions of varying speeds and the heights of the top frequencies are different. The frequencies of both graphs (a) and (b) are mathematically interrelated because, if the height of the top frequency decreases while the surface area of the trapezoid and the length of the top frequency DF remain the same, the slope of the flank portions must decrease as well, resulting in a longer length of the respective phase.

The degrees of angle WG to which the phases are attributed are equal to each other in both the shortest cycle period and the longer cycle period representations in graphs (a) and (b). Therefore, upon increasing the mass of the workpiece, extending the cycle period time length results in an extension of the times t for accelerating and delaying the movement while the length of the maximum speed remains constant. In master processor MP, the appropriate top frequencies DF of the phases belonging to the varicycle are stored in a table for different cycle period lengths of time to be inputted by keyboard TA. When a desired or preselected cycle period length of time is inputted into the master processor, the master processor selects from said table data representing the corresponding top frequency and delivers said data to the driving member processors HSP1, HSP2, OSP1, OSP2 and OS.

Figure 6:
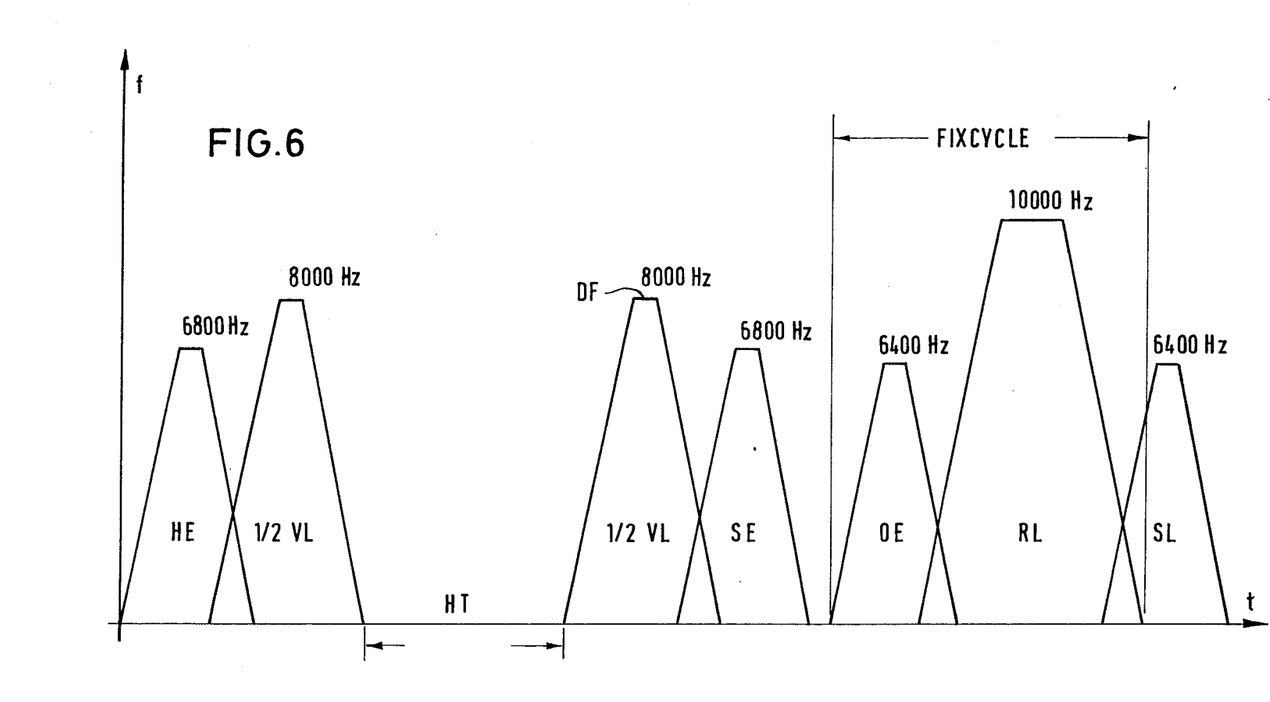
FIG. 6 is a graphical representation similar to FIG. 5 with respect to an overall longer cycle length having a holding time.

In FIG. 6, the frequency f applied to the respective step motors 10 of driving members HS, OS and VR is illustrated along the ordinate while the time t is illustrated along the abscissa of the graph. The top frequencies are shown in the drawing for each phase HE, VL, SE, OE, RL and SL. The maximum possible top frequency amounts to 16 kHz which, however, is not reached in the example shown in FIG. 6.

Furthermore, regarding the graph in FIG. 6, the advance movement phase VL is divided into two half advance movement phases ½ VL with a holding phase HT inserted between the two half movement phases. Such a movement pattern may be used for spraying the dies of the forging press with a spray material. The trapezoids of both half advance movement phases VL together comprise the same surface area of the return movement phase RL.

While the control system for a walking or lifting beam assembly of a forging press has been shown and described in detail, it is obvious that this invention is not to be considered as limited to the exact form disclosed, and that changes in detail and construction may be made therein within the scope of the invention without departing from the spirit thereof.

Having thus set forth and disclosed the nature of this invention, what is claimed is:

1. A control system for a walking beam assembly of a forging press having a press stroke with a predetermined operating cycle in which a workpiece is forged during the press stroke, and the walking beam assembly has at least one walking beam member movable by respective driving means in a cycle of movement phases including a closing movement, a lifting movement, an advance movement, a lowering movement, an opening movement, and a return movement, said respective driving means being operated by control mechanisms in a sequential control, said control system comprising:

(a) means for predetermining the lengths of cycle time periods for each of the opening and return movement phases to provide a selected fixed cycle time length having the shortest cycle time period possible with respect to the duration of a press stroke, and (b) means for varying the time lengths of at least some of the remaining movement phases to provide a preselected variable cycle time length dependent upon the mass of the workpiece being handled, (c) a step motor is operatively connected for effecting each movement phase.

2. A control system as defined in claim 1 wherein said control system includes means for continuously increasing the frequency of the step motor in each movement phase to a top frequency value and maintaining said top frequency value for a predetermined length of time and then continuously decreasing said frequency again.

3. A control system as defined in claim 2 wherein each movement phase when plotted with step motor frequency along an ordinate of a graph and time t along an abscissa of a graph defines a trapezoidal form produced along the time t abscissa, said trapezoidal form includes a rising flank portion and a falling flank portion, and the rising and falling flank portions of the frequencies of certain step motors overlap with each other in adjacent movement phases.

4. A control system as defined in claim 2 wherein the top frequency values for the variable movement phases are varied according to selected times while the lengths of the top frequencies are fixed, and the slopes of the rising and falling flank portions of the frequency are calculated respectively from an overall path of the walking beam assembly to be run through and a predetermined top frequency.

5. A control system as defined in claim 1 wherein a common master data processing means conveys operational signals to each of the step motors for each respective driving means via driving member data processors, said master data processing means includes means for applying specific values to driving member data processors connected to each one of the step motors for the driving means having a driving member, said specific values include an actual value of the position of the driving member, a desired value maintained at the end of the next movement phase, a source frequency value for calculating the length of the top frequency, and the degree of angle within the cycle length at which degree angle the movement is to be started, said driving member data processors drive the step motors in dependence on said specific values.

6. A control system as defined in claim 5 wherein monitoring means determines the actual position of the driving member at any time during operation of said system.

7. A control system as defined in claim 5 wherein the master data processing means includes data entry means to input data into the system.

8. A method for controlling the movement of a walking beam assembly of a forging press wherein the walking beam assembly has at least one walking beam member movable by respective driving members in a cycle of movement phases including a closing movement, a lifting movement, an advance movement, a lowering movement, an opening movement, and a return movement, said respective driving members being operated by control mechanisms in a sequential control, said method comprising:

(a) providing a master data processing means connected to each control mechanism for effecting control of each respective driving member, (b) providing a step motor operatively connected to effect movement of each respective driving member via a driving means, (c) each said control mechanism including a driving member data processor to control the step motor connected to the driving means for the respective driving member to effect each said movement phase, (d) applying specific values via the common master data processing means to each of the driving member data processors, (e) said specific values applied to said driving member data processors including an actual value of the position of the respective driving member, a desired value to be maintained at the end of the next movement phase, a source frequency value for calculating the top frequency of each said movement phase, and a degree of angle within a cycle length at which degree of angle the movement is to be started, (f) said driving member data processors drive the step motors in dependence on said specific values.

9. A control system process for a walking beam assembly of a forging press having a press stroke for pressing a workpiece and the walking beam assembly has at least one walking beam member movable by respective driving means in a cycle of movement phases including a closing movement, a lifting movement, an advance movement, a lowering movement, an opening movement, and a return movement, said respective driving means being operated by control mechanisms in a sequential control, said process comprising:

(a) predetermining the lengths of cycle time periods for each of the opening and return movement phases to provide a selected cycle time length forming a fixed cycle period dependent upon the duration of the press stroke, and (b) varying the lengths of cycle time periods for at least some of the remaining movement phases to provide a preselected cycle length of time forming a varied cycle period dependent upon the mass of the workpiece being handled.

10. A control system process as defined in claim 9 including operatively connecting a step motor to each respective driving means for effecting the movement phases, continuously increasing the frequency value of the step motor in each movement phase from zero to a top frequency value, and maintaining said top frequency value for a predetermined length of time and then continuously decreasing said frequency value again to zero.

11. A control system process as defined in claim 10 including
  plotting each step motor frequency along an ordinate of a graph and a time t along an abscissa of a graph to define a trapezoidal form produced along the time t abscissa, said trapezoidal form including a rising flank portion and a falling flank portion, and
  causing the rising and falling flank portions of the frequencies of certain step motors to overlap with each other in adjacent movement phases.

12. A control system process as defined in claim 10 including
  varying the top frequency values for the variable movement phases according to selected times while fixedly maintaining the lengths of the top frequencies, and
  calculating the respective slopes of the rising and falling flank portions of the frequency from (A) an overall path of the walking beam assembly to be run through and (B) a predetermined top frequency.

13. A control system process as defined in claim 10 including
  conveying operational signals from a common master data processing means to a driving member data processor for each of the step motors for each respective driving means,
  applying specific values to the driving member data processors via the operational signals to control each one of the step motors for the driving means having a driving member,
  said specific values include an actual value of the position of the driving member, a desired value maintained at the end of the next movement phase, a source frequency value for calculating the length of the top frequency, and the degree of angle within the cycle length at which degree angle the movement is to be started,
  driving the step motors with said driving member data processors in dependence on said specific values.

14. A control system process as defined in claim 13 including
  monitoring the actual position of the driving member at any time during operation of said system, and
  directing said actual position to the common master data processing means.

15. A control system for a walking beam assembly of a forging press having a press stroke with a predetermined operating cycle in which a workpiece is forged during the press stroke, and the walking beam assembly has at least one walking beam member movable by respective driving means in a cycle of movement phases including a closing movement, a lifting movement, an advance movement, a lowering movement, an opening movement, and a return movement, said control system comprising:
  (a) means for operating said respective driving means in a sequential control to define a cycle period in which a cycle of movement phases is completed in a preselected length of time,
  (b) means for conducting a predetermined fixed cycle portion of said preselected length of time for said cycle period,
  (c) said fixed cycle portion including the opening and return movement phases of said cycle, and
  (d) means for conducting a predetermined varied cycle portion of said preselected length of time for said cycle period dependent upon the mass of the workpiece being delivered
  (e) said varied cycle portion including at least some of the remaining movement phases of said cycle.

16. A control system as defined in claim 15 wherein said fixed cycle portion includes the closing movement phase of said cycle.

17. In a control system process for a walking beam assembly of a forging press having a press stroke with a predetermined operating cycle in which a workpiece is forged during the press stroke, and the walking beam assembly has at least one walking beam member movable by respective driving means in a cycle of movement phases including a closing movement, a lifting movement, an advance movement, a lowering movement, an opening movement, and a return movement, said control system process comprising:
  (a) operating said respective driving means in a sequential control to define a cycle period in which a cycle of movement phases is completed in a preselected length of time,
  (b) conducting a predetermined fixed cycle portion of said preselected length of time for said cycle period,
  (c) said fixed cycle portion including the opening and return movement phases of said cycle, and
  (d) conducting a predetermined varied cycle portion of said preselected length of time for said cycle period dependent upon the mass of the workpiece being delivered,
  (e) said varied cycle portion including at least some of the remaining movement phases of said cycle.

18. A control system process as defined in claim 17 wherein
  said fixed cycle portion includes the closing movement phase of said cycle.

19. A control system for a walking beam assembly of a forging press wherein the walking beam assembly has at least one walking beam member movable by respective driving means in a cycle of movement phases including a closing movement, a lifting movement, an advance movement, a lowering movement, an opening movement, and a return movement, said system comprising:
  (a) said respective driving means being operated by control mechanisms in a sequential control,
  (b) a step motor operatively connected to the driving means for effecting each of the movement phases,
  (c) means for continuously increasing the frequency of the step motor in each movement phase to a top frequency value and maintaining said top frequency value for a predetermined length of time and then continuously decreasing said frequency again.

20. A control system as defined in claim 19 wherein each movement phase when plotted with step motor frequency along an ordinate of a graph and time t along an abscissa of a graph defines a trapezoidal form produced along the time t abscissa, said trapezoidal form includes a rising flank portion and a falling flank portion, and
  the rising and falling flank portions of the frequencies of certain step motors overlap with each other in adjacent movement phases.

21. A control system process for a walking beam assembly of a forging press wherein the walking beam assembly has at least one walking beam member movable by respective driving means in a cycle of movement phases including a closing movement, a lifting movement, an advance movement, a lowering movement, an opening movement, and a return movement, said system process comprising:

(a) operating said respective driving means by control mechanisms in a sequential control,
(b) operatively connecting a step motor to each respective driving means for effecting the movement phases,
(c) continuously increasing the frequency of the step motor in each movement phase from zero to a top frequency value, and
(d) maintaining said top frequency value for a predetermined length of time and then continuously decreasing said frequency again to zero.

22. A control system process as defined in claim 21 including plotting each step motor frequency along an ordinate of a graph and a time (t) along an abscissa of a graph to define a trapezoidal form produced along the time (t) abscissa, said trapezoidal form including a rising flank portion and a falling flank portion, and causing the rising and falling flank portions of the frequencies of certain step motors to overlap with each other in adjacent movement phases.

23. A control system process as defined in claim 21 including varying the top frequencies for the variable movement phases according to available and required times while fixedly maintaining the lengths of the top frequencies, and calculating the respective slopes of the rising and falling flank portions of the frequency from (A) an overall path of the walking beam assembly to be run through and (B) a predetermined top frequency.

24. A control system process as defined in claim 21 including conveying operational signals from a common master data processing means to a driving member data processor for each of the step motors for each respective driving means, applyign specific values to the driving member data processors via the operational signals to control each one of the step motors for the driving means having a driving member, said specific values include an actual value of the position of the driving member, a desired value maintained at the end of the next movement phase, a source frequency for calculating the length of the top frequency, and the degree of angle within the cycle length at which degree angle the movement is to be started, driving the step motors with said driving member data processors in dependence on said specific values.

25. A control system as defined in claim 24 including monitoring the actual position of the driving member at any time during operation of said system, and directing said actual position to the common master data processing means.

* * * * *